(12) United States Patent
Kurioka (10) Patent No.: US 8,487,718 B2
(45) Date of Patent: Jul. 16, 2013

(54) CAPACITOR, RESONATOR, FILTER APPARATUS, COMMUNICATION DEVICE, AND ELECTRIC CIRCUIT

(75) Inventor: Hideharu Kurioka, Kyoto (JP)

(73) Assignee: Kyocera Corporation, Kyoto (JP)

( * ) Notice: Subject to any disclaimer, the term of this patent is extended or adjusted under 35 U.S.C. 154(b) by 757 days.

(21) Appl. No.: 12/602,465

(22) PCT Filed: Apr. 25, 2008

(86) PCT No.: PCT/JP2008/058140
§ 371 (c)(1),
(2), (4) Date: Nov. 30, 2009

(87) PCT Pub. No.: WO2008/149622
PCT Pub. Date: Dec. 11, 2008

(65) Prior Publication Data
US 2010/0178878 A1    Jul. 15, 2010

(30) Foreign Application Priority Data

May 30, 2007   (JP) .................................. 2007-143367

(51) Int. Cl.
*H03H 7/00* (2006.01)
*H01G 7/06* (2006.01)

(52) U.S. Cl.
USPC .......................................... 333/185; 361/277

(58) Field of Classification Search
USPC ................... 333/132, 185; 361/271, 277, 281
See application file for complete search history.

(56) References Cited

U.S. PATENT DOCUMENTS

| 6,052,271 | A | 4/2000 | Nakamura | 361/303 |
| 6,333,529 | B1 | 12/2001 | Ashida et al. | 257/295 |
| 6,686,817 | B2 * | 2/2004 | Zhu et al. | 333/205 |
| 7,109,818 | B2 * | 9/2006 | Rivkina et al. | 333/24 C |
| 2001/0001208 | A1 | 5/2001 | Nakamura | 257/295 |
| 2006/0043445 | A1 | 3/2006 | Wang | 257/295 |
| 2006/0175642 | A1 | 8/2006 | Dote et al. | 257/295 |
| 2006/0214205 | A1 | 9/2006 | Baniecki et al. | 257/295 |
| 2006/0214213 | A1 | 9/2006 | Bariecki et al. | 257/310 |
| 2007/0012977 | A1 * | 1/2007 | Wu et al. | 257/295 |

FOREIGN PATENT DOCUMENTS

| JP | 07-245237 | 9/1995 |
| JP | 11-251523 | 9/1999 |
| JP | 2005-129852 | 5/2005 |
| JP | 2006-073648 | 3/2006 |
| JP | 2006-196871 | 7/2006 |
| JP | 2006196871 A | 7/2006 |
| JP | 2006-222227 | 8/2006 |
| JP | 2006-310744 | 11/2006 |

OTHER PUBLICATIONS

English translation of Japanese office action dated Aug. 11, 2011 for corresponding Japanese application 2009517750.

* cited by examiner

*Primary Examiner* — Dean O Takaoka
*Assistant Examiner* — Alan Wong
(74) *Attorney, Agent, or Firm* — DLA Piper LLP (US)

(57) ABSTRACT

A capacitor is provided with a first electrode to which a direct current voltage is applied; a dielectric layer, which is arranged on the first electrode and is composed of an oxide dielectric material; and a second electrode, which is arranged on the dielectric layer, has a first portion where at least a part in contact with the dielectric layer is composed of a conductive oxide material having oxidizing property, and has a direct current voltage lower than that applied to the first electrode applied.

10 Claims, 6 Drawing Sheets

LEAKAGE CURRENT VALUE WITH TIME WHEN 5.0 V IS APPLIED TO CAPACITOR OF THE PRESENT INVENTION AT 125°C

FIG. 7

LEAKAGE CURRENT VALUE WITH TIME WHEN 5.0 V IS APPLIED TO CAPACITOR OF COMPARATIVE EXAMPLE 1 AT 125°C

FIG. 8

LEAKAGE CURRENT VALUE WITH TIME WHEN 5.0 V IS APPLIED
TO CAPACITOR OF COMPARATIVE EXAMPLE 2 AT 125°C

FIG. 9

LEAKAGE CURRENT VALUE WITH TIME WHEN 5.0 V IS APPLIED
TO CAPACITOR OF COMPARATIVE EXAMPLE 3 AT 125°C

FIG. 10 ian patent application No. 2007-143367 filed May 30, 2007, the entire contents of which are incorporated herein by reference.

CAPACITOR, RESONATOR, FILTER APPARATUS, COMMUNICATION DEVICE, AND ELECTRIC CIRCUIT

CROSS-REFERENCE TO THE RELATED APPLICATIONS

This application is a national stage of international application No. PCT/JP2008/058140 filed Apr. 25, 2008, and claims the benefit of priority under 35 USC 119 to Japanese Patent Application No. 2007-143367 filed May 30, 2007, the entire contents of which are incorporated herein by reference.

TECHNICAL FIELD

The present invention relates to a capacitor using an oxide dielectric thin film, a resonator, a filter apparatus, a communication device, and an electric circuit using the capacitor.

BACKGROUND ART

A perovskite oxide dielectric such as paraelectric strontium titanate ($SrTiO_3$, referred to as STO hereinafter) thin film and ferroelectric barium strontium titanate ((Ba, Sr)$TiO_3$ referred to as BST hereinafter) thin film is high in dielectric constant as compared with a silicon oxide ($SiO_2$) thin film, a silicon nitride ($Si_3N_4$) thin film, and a tallium oxide ($Ta_2O_5$) thin film which have been conventionally used as an IC dielectric thin film capacitor, so that it is expected as a preferable dielectric material to reduce the area of the IC dielectric thin film capacitor.

As a method for forming an oxide dielectric such as the perovskite oxide dielectric thin film, while a sputtering method, a CVD (Chemical Vapor Deposition) method or the like is used, it is necessary to perform an oxidizing process and a crystallizing process in atmosphere containing oxygen at high temperature in any method in order to obtain a high dielectric constant. Therefore, the bottom electrode and the top electrode sandwiching the dielectric thin film are conventionally made of a material which is high in heat resistance and is not likely to be oxidized, or an oxide conductive material which has conductivity even when oxidized. For example, Pt, Ir, and Ru have been used.

Among them, Pt is most widely and generally used as the electrode material because it is high in heat resistance and hardly oxidized. However, since Pt is high in catalytic ability for a reduction reaction, the perovskite oxide dielectric is reduced in the process of producing the capacitor, and its characteristics problematically deteriorate. Especially, when Pt is used in the top electrode, the effect is considerably problematic, and the top electrode material not causing deterioration in characteristics is required.

Thus, as the top electrode material to replace Pt, a capacitor using an electrode containing oxygen, or an iridium oxide serving as an oxide conductive material is proposed to be used in a ferroelectric memory mainly.

For example, Patent Document 1 discloses an example in which a top electrode including platinum, iridium, and ruthenium containing oxygen of $10^{20}$ atm/$cm^3$ or more is formed on an oxide dielectric film including lead zirconate titanate (PZT).

In addition, Patent Document 2 discloses a ferroelectric capacitor including a top electrode having a layered structure including a first conductive film made of an iridium oxide and a second conductive layer made of Pt or Ir.

Patent Document 1: Japanese Unexamined Patent Publication No. 11-251523

Patent Document 2: Japanese Unexamined Patent Publication No. 2006-222227

DISCLOSURE OF THE INVENTION

Problems to be Solved by the Invention

As described above, the capacitor using the conductive oxide such as the iridium oxide for the top electrode to reduce process damage is mainly used in the ferroelectric memory. In general, when the ferroelectric memory is operated, voltages having different polarities are applied. For example, when the voltage to write a state of "0" is a positive voltage, the voltage to write a state of "1" is an opposite negative voltage.

Meanwhile, it is considered that the oxide dielectric is not only used in the ferroelectric memory but also used in a decoupling capacitor. When it is used in such application, it is assumed that a voltage of the same polarity is continuously applied, and thus it is important to ensure long-term reliability under the condition that the voltage of the same polarity is continuously applied.

However, since the voltage of the same polarity is not continuously applied to the capacitor used in the ferroelectric memory, the effect of the conductive oxide material on the long-term reliability under the condition that the voltage of the same polarity is continuously used, which is required for the capacitor such as the decoupling capacitor, is not known and there is no capacitor which is arranged on a circuit in view of such reliability.

Thus, the inventor of the present invention has intensively examined the long-term reliability of the capacitor using the conductive oxide material for the top electrode when the voltage of the same polarity is continuously applied, and found that the long-term reliability considerably depends on the polarity of the applied voltage, and reached the present invention.

Thus, it is an object of the present invention to provide a capacitor whose reliability can be improved when a voltage of the same polarity is continuously applied.

Means for Solving the Problem

A capacitor according to the present invention includes a first electrode applied with a DC voltage, a dielectric layer located on the first electrode and made of an oxide dielectric, and a second electrode which comprises a first portion being made of an oxidizable oxide conductive material for oxidizing the dielectric layer and being located on the dielectric layer, and applied with a DC voltage lower than the DC voltage applied to the first electrode.

In addition, the dielectric layer of the above capacitor preferably includes a perovskite oxide crystal.

In addition, the part of the second electrode having contact with the dielectric layer of the above capacitor preferably is an iridium oxide.

In addition, the second electrode of the above capacitor comprises a layered structure having an iridium oxide layer and an iridium layer deposited in this order from the dielectric layer side.

In addition, the dielectric layer of the above capacitor preferably includes a material having a dielectric constant varying based on the application of the DC voltage.

A resonator according to the present invention is configured by connecting the above capacitor to an impedance element having an inductor portion.

A filter apparatus according to the present invention includes the above resonator.

A communication device according to the present invention includes at least one of a receive circuit and a transmission circuit each comprising the filter apparatus.

In addition, an electric circuit according to the present invention in which a capacitor element comprising a first electrode, a dielectric layer located on the first electrode and made of an oxide dielectric, and a second electrode located on the dielectric layer, comprising a first portion made of an oxidizable oxide conductive material for oxidizing the dielectric layer, and applied with a DC voltage lower than a DC voltage applied to the first electrode, and the capacitor element is connected to a bias circuit for applying the DC voltage to the dielectric layer such that the potential of the DC voltage applied to the first electrode is smaller than that of the first electrode.

Effect of the Invention

According to the capacitor of the present invention, when the DC voltage of the same polarity is continuously applied, the leakage current of the capacitor is prevented from increasing with time, the electric characteristics can be stable for a long period of time, and the reliability of the capacitor is improved. When the resonator, the filter apparatus, and the communication device are configured with the capacitor, the reliability thereof can be also improved.

BEST MODE FOR CARRYING OUT THE INVENTION

A capacitor according to the present invention will be described in detail with reference to the drawings. In addition, the same references are used to represent the same parts, and overlapping descriptions are omitted in the following drawings.

Figure 1A:
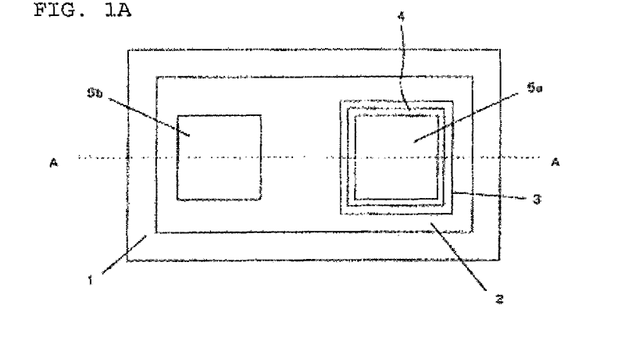
FIGS. 1A and 1B are a plan view showing one example of an embodiment of a capacitor of the present invention and a cross-sectional view taken along line A-A' in FIG. 1A.
Figure 1B:
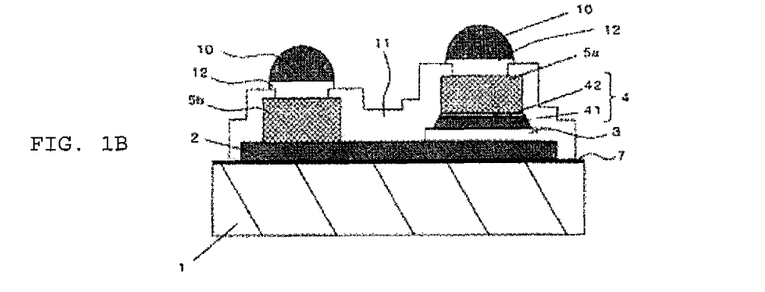

FIGS. 1A and 1B show one example of an embodiment of the capacitor according to the present invention, in which FIG. 1A is a plan view showing a perspective state, and FIG. 1B is a cross-sectional view taken along line A-A' in FIG. 1A.

Referring to FIG. 1, reference 1 represents a support substrate, reference 2 represents a first electrode (referred to as the bottom electrode occasionally hereinafter), reference 3 represents a dielectric, reference 4 represents a second electrode (referred to as the top electrode occasionally hereinafter), and references 5a and 5b represent connection layers connecting to an external circuit. The top electrode 4 includes a first portion 41 provided on the dielectric 3 and made of an oxidizable oxide conductive material, and a second portion 42 deposited thereon.

The capacitor shown in FIG. 1 functions when a high frequency signal and a DC voltage are applied thereto through the connection layers 5a and 5b. That is, an input/output terminal of the high frequency signal and an input/output terminal of the DC voltage are shared. Thus, a portion where the bottom electrode 2, the dielectric 3, and the top electrode 4 overlap with each other in a planar view serves as a capacitance formation part. Here, a potential applied to the connection layer 5a is lower than that to the connection layer 5b.

The support substrate 1 is a ceramic substrate, such as an alumina substrate, a single-crystal substrate, such as a sapphire substrate or silicon substrate or the like. In addition, when a silicon semiconductor substrate is used, a silicon oxide layer having a thickness of about 300 nm is formed on the surface of the substrate in general.

The bottom electrode 2, the dielectric 3, and the top electrode 4 (41, 42) are sequentially formed as layers on the support substrate 1 so as to cover almost the entire surface of the support substrate 1. After these layers have been formed, the top electrode 4(41, 42), the dielectric 3, and the bottom electrode 2 are sequentially etched so as to have predetermined shapes. Then, the connection layers 5a and 5b are formed on almost the entire surface of the support substrate 1 and etched so as to have predetermined shapes. In addition, the connection layers 5a and 5b connected to the external circuit may be formed and etched so as to have the predetermined shapes after the top electrode 4 (41, 42), the dielectric 3, and the bottom electrode 2 have been sequentially formed and etched as described above, or they may be formed on the entire surface of the support substrate 1 and etched so as to have the predetermined shapes continuously after the top electrode 4 (41, 42) has been formed on almost the entire surface of the support substrate 1. In this case, although the first connection layer 5b is not formed on an extension part of the bottom electrode 2, it does not matter in view of the characteristics of the capacitor because the extension part of the bottom electrode 2 can serve as a first bias terminal directly connected to the external circuit.

In forming the bottom electrode 2, the dielectric 3, and the top electrode 4 (41, 42), it is desirable to minimize impurities such as particles which could cause the characteristics of the capacitor to deteriorate, between the bottom electrode 2 and the dielectric 3, and between the dielectric 3 and the top electrode 4 (41). Therefore, it is desirable that the etching process is not performed between the formation of the bottom electrode 2 and the formation of the dielectric 3, and between the formation of the dielectric 3 and the formation of the top electrode 4 (41).

Since the dielectric 3 serving as an oxide dielectric such as a perovskite oxide dielectric has to be formed through a high-temperature process, the bottom electrode 2 needs to have a high melting point to endure the high temperature. More specifically, it is made of a metal material such as Pt, Pd, Ir, and Ru. When the metal such as Ir and Ru is used, it is highly likely that its surface is oxidized at the time of forming the dielectric 3, but since each oxide has conductivity, even the metal material in which the oxide becomes conductive can be used as long as it has a high melting point. Furthermore, SRO which is a perovskite conductive oxide material can be used. Especially, in the case where the perovskite oxide dielectric is used for the dielectric 3, when SRO is used for the bottom electrode 2, both of the bottom electrode 2 and the dielectric 3 come to have a perovskite structure, and the lattices can be easily matched so that it is expected that the dielectric constant of the dielectric 3 can increase.

The bottom electrode 2 is preferably formed by a sputtering method. When the above metal material is used, it is preferably heated to 700° C. to 900° C. which is equal to the formation temperature of the dielectric 3 and kept for a certain time before the dielectric 3 is formed so that it can become a flat layer.

While the bottom electrode 2 is desirably thick in view of the resistance component of the bottom electrode 2 and the layer continuity of the bottom electrode 2, it is desirably relatively thin in view of adhesion with the support substrate 1, so that the thickness thereof is determined in view of both of them. More specifically, the thickness is 30 nm to 5 µm. When the thickness of the bottom electrode 2 is 30 nm or more, the continuity of the bottom electrode 2 can be ensured. Meanwhile, when the thickness of the bottom electrode is 5 µm or less, the adhesion with the support substrate 1 can be kept in preferable state, and the warpage of the support substrate 1 is prevented.

It is desirable to form an adhesion layer 7 on the support substrate 1 before the bottom electrode 2 is formed. While the adhesion layer 7 can improve the adhesion between the support substrate 1 and the bottom electrode 2, it needs to have endurance for the following processes after the bottom electrode 2. As the material of the adhesion layer 7, $TiO_2$ is favorably used, for example. In addition, the thickness of the adhesion layer 7 is 5 nm to 30 nm, for example.

The material of the dielectric 3 is not particularly limited as long as it is the oxide dielectric, and $SiO_2$, $Ta_2O_5$, and the like can be used, but a perovskite oxide crystal dielectric is preferable because it has a high dielectric constant and an area of the capacitance formation part can be small when the capacitor is formed to have a certain desired capacitance, as compared with $SiO_2$ or $Ta_2O_5$. Among them, when barium strontium titanate (BST) is used, dielectric loss is small, and the temperature characteristics of the dielectric can be controlled and the variation of the dielectric constant due to the voltage application can be controlled based on the ratio between barium and strontium.

The dielectric 3 is formed on the surface (upper surface) of the bottom electrode 2. For example, it is formed by a sputtering method until it has a desired thickness, using the perovskite oxide crystal material as a target. At this time, when high-temperature sputtering is performed under the condition that the substrate is heated to a high temperature such as 800 C.°, the dielectric 3 can have a high dielectric constant. In addition, the dielectric 3 may be formed at several times under different conditions instead of being formed at one time. Thus, the characteristics of the dielectric 3 can be finely adjusted.

Next, the top electrode 4 may have one layer, or two-layer layered structure as shown in FIG. 1, or a more-layer layered structure as long as the part having contact with the dielectric 3 has an oxidizable oxide conductive material. In addition, the part containing the oxide conductive material and a part not containing it may be mixed in one layer without being clearly separated. For example, the content of oxygen may vary gradually in a thickness direction. Here, the oxidizable oxide conductive material is a material which oxides the dielectric 3 and reduces itself, and also a material that contains oxygen, and when the perovskite oxide crystal dielectric such as BST is used for the dielectric 3, for example, an iridium oxide or a ruthenium oxide may be used.

Here, when the top electrode 4 (41) having contact with the dielectric 3 as shown in FIG. 1 is made of the iridium oxide, it is formed as follows. An iridium oxide layer can be formed by reactive sputtering with a layer formation gas containing oxygen, using iridium as a target. The content ratio of oxygen in the layer formation gas is preferably from 20% to 70%, for example. When the oxygen content ratio is 20% or more, Ir which has not reacted with oxygen is prevented from remaining in the layer. Meanwhile, when the content ratio of oxygen is 70% or less, layer formation rate is prevented from largely reducing, which lessens the impact on the productivity of the capacitor. Furthermore, the top electrode 4 (41) is formed in vacuum at relatively high temperature such as 250° C. or more in view of the adhesion with the dielectric 3 in many cases. Thus, according to this embodiment, since the top electrode 4 (41) is made of the oxidizable oxide conductive material such as the iridium oxide, oxygen is supplied to the dielectric 3 as well while the layer is formed, so that an oxygen vacancy is prevented from being generated in the dielectric 3, and the characteristics of the dielectric 3 is prevented from deteriorating due to the formation of the top electrode 4 (41).

In addition, since iridium oxide is extremely low in catalytic ability for a reduction reaction, the dielectric 3 is prevented from being reduced in a step of removing (ashing) a patterning photoresist from the capacitor.

Referring to FIG. 1, the second portion 42 is formed on the first portion 41 in the top electrode 4. The second portion serves to ensure the adhesion between the second connection layer 5a connected to the external circuit and the first portion 41 to improve connection reliability, and protects the first portion 41. Especially, when the iridium oxide is used for the first portion 41, and Ir is used for the second portion, oxygen is prevented from escaping from the dielectric 3 through the first portion 41 because Ir has low oxygen permeability, so that the characteristics of the capacitor can be stabilized.

In addition, it is preferable that the main surface of the top electrode 4 which is in contact with the dielectric 3 is larger than the opposite main surface of the top electrode 4, that is, the cross-sectional shape of the top electrode 4 is roughly trapezoidal for example. When the top electrode 4 has such a shape, less leakage current is generated in the dielectric 3.

The connection layers 5a and 5b are provided to enhance the reliability of the connection with the external circuit, and preferably made of low-resistance metal such as Au and Cu. The top electrode 4 and the bottom electrode 2 can be favorably connected to the external circuit through the connection layers 5a and 5b.

While the layer thicknesses of the connection layers 5a and 5b are not particularly limited as long as the connection with the external circuit is ensured, when they are set so as to be sufficiently thicker than that of the top electrode 4 (41, 42), five times or more, for example, and the first connection layer 5b is formed on the bottom electrode 2 at the same time, the height of the second connection layer 5a on the top electrode 4 can be roughly the same as that of the first connection layer 5b on the bottom electrode 2, so that connection to the circuit can be facilitated.

After each layer has been formed as described above, the top electrode 4, the dielectric 3, and the bottom electrode 2 are sequentially etched from the top layer into the predetermined shapes. The etching process is performed such that a resist is uniformly applied onto the entire surface by a spin coating method, the resist is patterned into the predetermined shape by a photolithography method, and wet etching or dry etching is performed. When Au or Cu is used for the connection layers 5a and 5b, the wet etching is preferably used. In addition, the dry etching is used for the top electrode 4 (41, 42) in general. The dry etching is performed with an electron cyclotron resonance apparatus (ECR apparatus) using argon plasma as an etchant.

In addition, the dielectric 3 may be etched by either the wet etching or dry etching. In addition, while the bottom electrode 2 may be etched by either the wet etching or dry etching, when the bottom electrode 2 is thick, the dry etching is desirably performed similar to that of the top electrode 4 (41, 42) in view of patterning precision.

Solder bumps 10 are formed on the connection layers 5a and 5b for surface mounting of the capacitor. According to the example shown in FIG. 1, a protection layer 11 is made of a thermo-setting resin, for example, such that one part of each upper surface of the connection layers 5a and 5b is exposed, and then solder diffusion prevention layers 12 are made of Ni or the like on the upper surfaces of the exposed connection layers 5a and 5b, and the solder bump 10 can be formed by printing a solder paste into a desired shape at a desired position and performing a reflow process. The capacitor is mounted on another circuit substrate with the solder bump 10, and the capacitor is electrically connected to the external circuit through the solder bump 10. In addition, the capacitor may be electrically connected to the external circuit by connecting the connection layers 5a and 5b to a pad provided on the another circuit substrate through a thin metallic wire without providing the solder bump 10.

According to the above-described capacitor in this embodiment, while a DC voltage having the same polarity is continuously applied, a leakage current of the capacitor is prevented from increasing with time, so that the electric characteristics can be stable for a long period of time, and the reliability of the capacitor can be improved.

Although the reason is not clear, it is assumed as follows.

While the DC voltage of the same polarity is continuously applied to the capacitor, the leakage current increases with time, and the capacitor is broken down eventually in general. The reason that the leakage current increases is considered due to the fact that oxygen vacancy existing in the oxide dielectric migrates to a cathode by an electric field of the applied DC voltage, and it is accumulated at a grain boundary and an interface between the electrode and dielectric, and barriers at those parts are lowered, so that the breakdown is caused eventually. Especially, in the case of capacitor using a thin layer dielectric, while the leakage current is prevented by forming the barrier at the interface between the electrode and the dielectric in many cases, when the DC voltage is continuously applied, the oxygen vacancy is accumulated at an interface between the cathode (negative) electrode and the dielectric, and as a result, the barrier of the interface between the electrode and the dielectric is lowered, so that it is considered that an electron overcomes the barrier and the leakage current increases. In addition, the pair of electrodes sandwiching the dielectric includes an anode (positive) electrode on the side (high in potential) connected to a first bias terminal and a cathode (negative) electrode on the side (low in potential) connected to a second bias terminal.

While the oxygen vacancy is generated in the dielectric when the dielectric is formed and also generated due to process damage during the production of the capacitor, it is known that the oxygen vacancy is more likely to be generated in the case of the perovskite oxide dielectric.

According to this embodiment, the top electrode of the capacitor is made of the oxidizable oxide conductive material at the part having contact with the dielectric layer, and this top electrode serves as the cathode electrode. Therefore, while the DC voltage is continuously applied, the oxygen vacancy migrates to this top electrode side, but it is considered that due to the oxidizable oxide conductive material of the top electrode, the migrated oxygen vacancy is not accumulated at the interface between the top electrode and the dielectric but migrates into the oxidizable oxide conductive material. As a result, since the barrier of the interface between the top electrode and the dielectric is considerably prevented from being lowered, it is considered that the leakage current is prevented from increasing, so that the reliability of the capacitor is improved.

Furthermore, since the oxide conductive material is provided at the part of the top electrode having contact with the dielectric layer, oxygen is supplied to the dielectric in the process of forming the oxide conductive material, so that the oxygen vacancy can be prevented from being generated in the dielectric in the step of producing the capacitor.

In addition, when the dielectric of the capacitor shown in FIG. 1 is made of the perovskite crystal, the oxygen vacancy is especially likely to be generated, but the reliability can be considerably improved by using the oxidizable oxide conductive material at the portion of the top electrode having contact with the dielectric, and arranging the top electrode to serve as the cathode electrode. In addition, since the oxide conductive material is used at the portion of the top electrode having contact with the dielectric, the oxygen vacancy can be prevented from being generated in the capacitor production process step, so that the reliability can be more improved.

In addition, when the oxidizable oxide conductive material is an iridium oxide in the capacitor shown in FIG. 1, the oxygen vacancy which has migrated to the top electrode side can be effectively taken therein because the iridium oxide is relatively easy to be reduced, so that the reliability can be improved.

Furthermore, when the top electrode of the capacitor shown in FIG. 1 has a layered structure in which an iridium oxide layer and an iridium layer are deposited in this order from the layer having contact with the dielectric layer, iridium suppress the removal of oxygen from the dielectric through the iridium oxide layer while the capacitor is produced, especially while the protection layer is formed after the top electrode layer is formed, so that the reliability of the capacitor is further improved.

Figure 10:
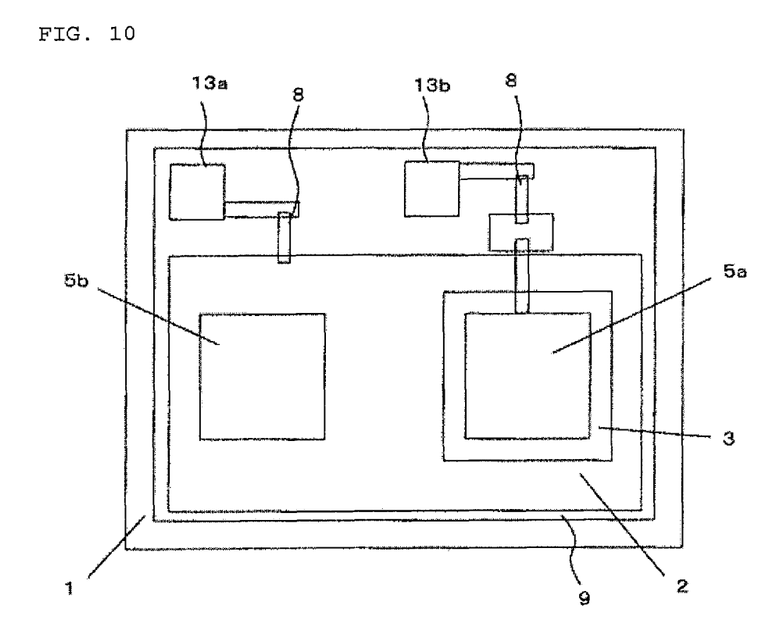
FIG. 10 is a plan view showing a variation of one embodiment of the capacitor according to the present invention.

In addition, although the description has been made of the case where the input/output terminal of the high frequency signal and the input/output terminal of the DC voltage are shared in FIG. 1, an input/output terminal of the high frequency signal and an input/output terminal of the DC voltage may be separately provided as shown in FIG. 10. In this case, a first bias connection layer 13a and a second bias connection layer 13b serving as the input/output terminals of the DC voltage are further provided other than the connection layers 5a and 5b serving as the input/output terminals of the high frequency signal. While it is necessary to provide the circuit to isolate the DC component from the high frequency component in the external circuit in the case shown in FIG. 1, it is not necessary in the structure shown in FIG. 10. In addition, in this case, when a quarter-wavelength inductor or a resistor 8 having high resistance value with respect to the propagating high frequency signal is provided between the first bias connection layer 13a and the bottom electrode 2 and between the second bias connection layer 13b and the top electrode 4, the DC voltage can be applied to the dielectric 3.

Figure 2:
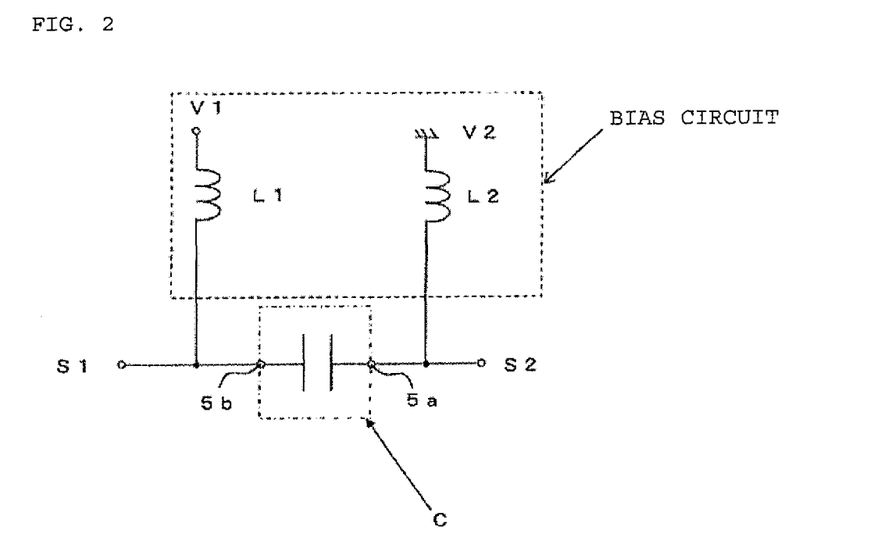
FIG. 2 is an equivalent circuit diagram of an electron circuit connecting the capacitor shown in FIG. 1 to a bias circuit.

Next, such a capacitor will be described with reference to a circuit diagram. FIG. 2 is an equivalent circuit diagram of an electric circuit according to one embodiment of the present invention.

Referring to FIG. 2, reference C represents the capacitor having the structure shown in FIG. 1, reference 81 represents a first terminal of a high frequency signal, reference S2 represents a second terminal of the high frequency signal, reference V1 represents a first bias terminal, reference V2 represents a second bias terminal, and references L1 and L2 represent inductors serving as impedance elements having inductor portions. As the inductor, a choke coil containing a RF preventing inductance component for applying a DC voltage (bias signal) may be used, for example. The capacitor C has the support substrate 1, the bottom electrode 2, the dielectric 3, and the top electrode 4 shown in FIG. 1, and the bottom electrode 2 is electrically connected to the first terminal S1 through the first connection layer 5b, and the top electrode 4 is electrically connected to the second terminal S2 through the connection layer 5a. Here, the first and second terminals S1 and S2 serve as the input/output terminals of the high frequency signal. In addition, the first bias terminal V1 and the second bias terminal V2 are electrically connected to the connection layer 5b of the capacitor C and the connection layer 5a of the capacitor C through the inductor L1 and the inductor L2, respectively. Here, a bias circuit includes the first and second bias terminals V1 and V2, and the inductors L1 and L2. In addition, since the second bias terminal V2 is at the ground potential (reference potential) in FIG. 2, the potential of the DC voltage applied to the first bias terminal V1 is higher than the potential applied to the second bias terminal V2. That is, the connection layer 5b is applied with the DC voltage higher than that of the connection layer 5a.

In addition, although the description has been made of the case where the inductor portion is used in the bias circuit in FIG. 2, a resistance component may be used instead of the inductor portion as long as the high frequency signal is prevented from leaking to the bias circuit.

Figure 3:
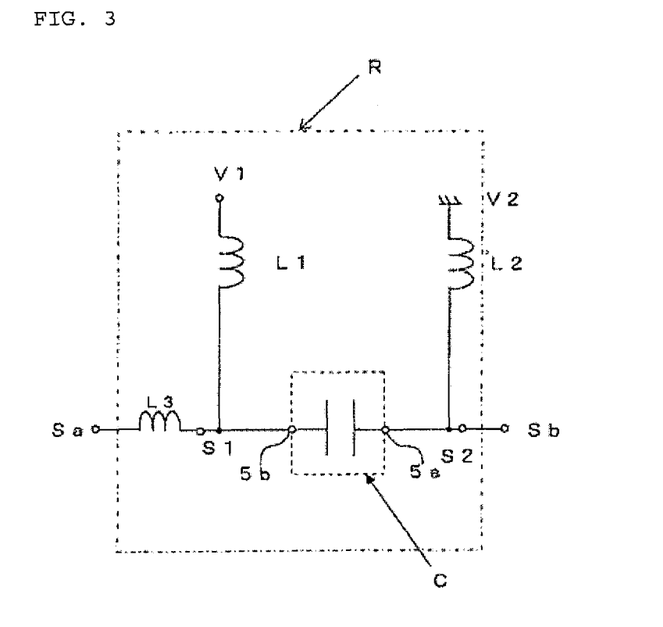
FIG. 3 is an equivalent circuit diagram showing one example of a resonant circuit according to the present invention.

Next, a description will be made of a case where a resonator is configured by the above-described capacitor. FIG. 3 is an equivalent circuit diagram when a resonant circuit is configured by the capacitor having the structure shown in FIG. 1, in which a LC series resonant circuit is shown.

In the equivalent circuit shown in FIG. 3, reference L3 represents an impedance element having an inductor portion, reference C represents the capacitor having the structure shown in FIG. 1, and references Sa and Sb represent RF signal (high frequency signal) terminals. Thus, a resonant circuit R is configured. In addition, a DC limitation capacitance element to be provided between the inductor L3 and a connection point of the first bias terminal V1 and the capacitor C is omitted.

When the capacitor C having the structure shown in FIG. 1 is used as a capacitative element of the resonant circuit, the electric characteristics of the resonant circuit are stable for a long period of time, and the reliability thereof is high.

Furthermore, when the dielectric of the capacitor C is made of a material whose dielectric constant varies according to the application of the DC voltage in the equivalent circuit diagram in FIG. 3, the capacitance value can vary depending on the applied voltage. Therefore, the resonant frequency of the resonant circuit can be set to a desired value. For example, when it is assumed that an initial capacitance value of the capacitor C is Ct1, and an inductance value of the inductor L1 is L1, a resonant frequency f1 is expressed as $f1=1/(2\pi(L1 \cdot Ct1)^{1/2})$ when the DC voltage has an initial value (reference value). Thus, when the voltage applied to the capacitor C is changed and the capacitance value is changed to Ct2, a resonant frequency f2 is expressed as $f2=1/(2\pi(L1 \cdot Ct2)^{1/2})$. That is, the resonant frequency of the resonant circuit R can be adjusted to a desired value only by adjusting the capacitance value of the capacitor C based on the applied voltage, so that a tunable resonant circuit can be formed.

In addition, while the description has been made of the resonant circuit in FIG. 3, a highly reliable circuit module can be provided when the capacitor of the present invention is used in a matching circuit, a phase-shift circuit, or an attenuation circuit similarly. In addition, when the dielectric of the capacitor is made of a material whose dielectric constant varies according to the applied DC voltage, the circuit module can be a tunable matching circuit, a tunable phase-shift circuit, or a tunable attenuation circuit which can adjust its characteristics desirably.

Next, a description will be made of a filter apparatus according to the present invention.

Figure 4:
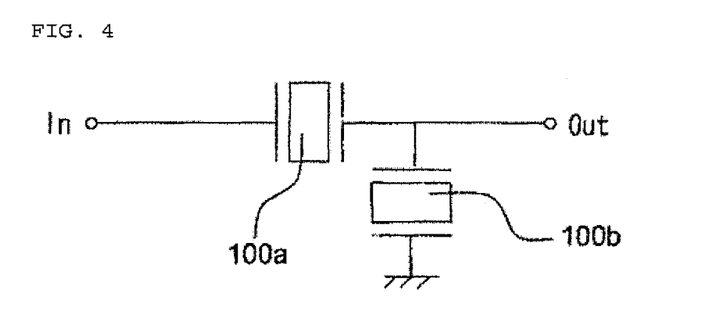
FIG. 4 is an equivalent circuit diagram showing one example of a filter apparatus according to the present invention.

FIG. 4 is an equivalent circuit diagram showing one embodiment of the filter apparatus according to the present invention.

The filter apparatus shown in FIG. 4 has a resonator 100a is arranged between an input terminal In and an output terminal Out, and a resonator 100b is arranged between a connection line connecting the resonator 100a to the output terminal Out and a reference potential terminal. Each of the resonators 100a and 100b has the resonant circuit shown in FIG. 3. In addition, according to the example shown in FIG. 4, the reference potential is the ground potential.

In addition, the resonator 100b of the present invention may be connected only between an input/output line connecting the input terminal In to the output terminal Out and the reference potential terminal, or the resonator 100a may be connected only to the input/output line.

Thus, a ladder-type filter may be formed, or a balance-type filter such as unbalanced input-balanced output may be formed.

Next, a communication device according to the present invention will be described.

Figure 5:
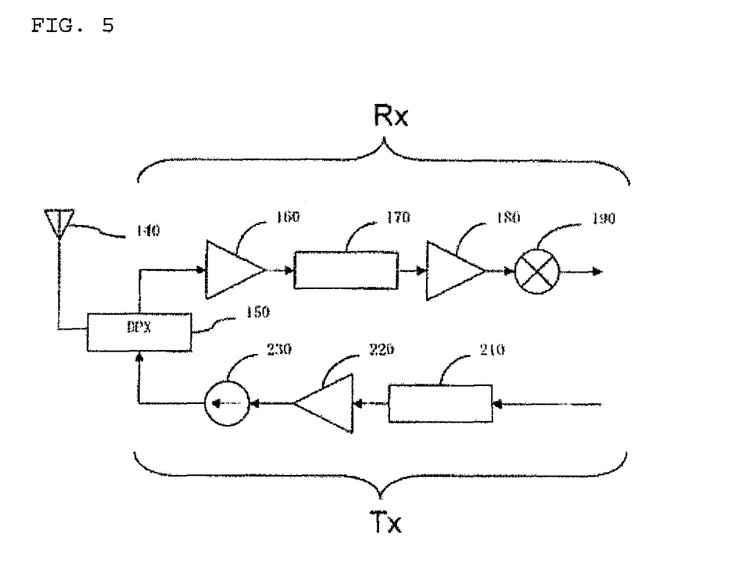
FIG. 5 is a block diagram showing one example of a communication device according to the present invention.

FIG. 5 is a block diagram showing a communication device according to one embodiment of the present invention.

Referring to FIG. 5, a transmission circuit Tx and a receive circuit Rx are connected to an antenna 140 through a duplexer 150. A transmitted high frequency signal passes through a filter 210 in which its unnecessary signal is removed, a power amplifier 220 in which it is amplified, an isolator 230, and the duplexer 150 and then it is emitted from the antenna 140. In addition, a high frequency signal received by the antenna 140 passes through the duplexer 150, a low noise amplifier 160 in which it is amplified, a filter 170 in which its unnecessary signal is removed, an amplifier 180 in which it is amplified again, and a mixer 190 in which it is converted to a low frequency signal.

Referring to FIG. 5, when the filter apparatus of the present invention is used in the duplexer 150, the filter 170, or the filter 210, the communication device can have a high Q value.

In addition, although the description has been made of the communication device having the transmission circuit Tx and the receive circuit Rx in FIG. 5, the communication device may have either the transmission circuit Tx or the receive circuit Rx.

According to the communication device shown in FIG. 5, since the capacitor provided in the filter apparatus is stable in electric characteristics for a long period of time, the communication device is also stable in electric characteristics for a long period of time. Thus, such a highly reliable communication device can be favorably used in a mobile phone, a personal handyphone (PHS), an amateur radio portable transceiver, a portable communication terminal such as an IC card, an electronic information processing terminal such as a palm-top computer, a car navigation system, and an ETC (electronic toll collection system) in a car.

The present invention is not limited to the above embodiments, and various kinds of modifications and variations may be added without departing from the scope of the present invention.

For example, after the top electrode second portion has been formed, a protection layer may be formed of $SiO_2$ or the like so as to expose one part of the upper surfaces of the top electrode second portion and the bottom electrode layer 2, and an adhesion layer and the connection layers 5a and 5b may be formed. As a result, moisture resistance of the capacitor is improved.

In addition, although the resonant circuit R has been described with reference to FIG. 3, the constitution of the resonant circuit R may be modified to a LC parallel configuration or a multistage configuration according to purpose. In addition, as the impedance element having the inductor portion, a transmission line or a λ/4 resonator or the like may be used.

EXAMPLE

Next, a description will be made of an example to specify the present invention. As the example, a description will be made of a case where the capacitor shown in FIG. 1 is located in the resonant circuit shown in FIG. 3.

First, a $TiO_2$ layer of a thickness of 30 nm was formed as an adhesion layer on the support substrate 1 made of a silicon substrate on which a $SiO_2$ layer having the thickness of 300 nm was formed by thermal oxidation. The $TiO_2$ layer was formed by thermally oxidizing Ti at 660° C.

Then, the bottom electrode 2 was formed by sputtering Pt at a substrate temperature of 400° C. Then, the substrate was put in a sputtering apparatus to form the dielectric 3, and prior to the formation of the dielectric 3, the substrate was subjected to a heat treatment in vacuum at 750° C. for 30 minutes so that its surface was flattened.

Then, an Ar gas was introduced into a chamber and a BST layer of 5 nm was formed with only the Ar gas as a layer formation gas while the substrate temperature was set at 750° C. Then, an oxygen gas was introduced into the above chamber so that a ratio of Ar and $O_2$ becomes 6:1 (referred to as Ar/$O_2$=6/1 hereinafter) and the BST layer was subjected to a heat treatment. Then, a BST layer of 95 nm was formed with a layer formation gas of Ar/$O_2$=6/1. As the target, a target made of $(Ba_{0.5}Sr_{0.5})TiO_3$ was used. Thus, the dielectric 3 was produced.

Then, the top electrode 4 including the first portion 41 made of an iridium oxide and the second portion 42 made of iridium was formed on the dielectric 3 by a sputtering method as follows. The first portion 41 as an iridium oxide layer of 100 nm was formed at the substrate temperature of 250° C. with a layer formation gas of Ar/$O_2$=1/1, using iridium as the target. Then, the second portion 42 as an iridium layer of 30 nm was formed with a layer formation gas of Ar.

Then, a photoresist was applied and the photoresist was processed into a predetermined shape by a photolithography method, and the top electrode layer 4 (41, 42) was formed into a desired shape in the ECR apparatus by dry etching. Then, similarly, with the photolithography method, the dielectric 3 and the bottom electrode 2 were formed into desired shapes by etching.

Then, an Au layer of 1200 nm was formed on the entire surface of the substrate at the substrate temperature of 250° C. by a sputtering method, and then the photoresist was processed into a predetermined shape by the photolithography method, and then the Au layer was patterned the layer by wet etching, and thus the connection layers 5a and 5b were produced.

Finally, the above capacitor was subjected to a heat treatment in air at 500° C. for 1 hour.

The resonant circuit as shown in FIG. 3 was formed with the capacitor produced as described above. The connection layer 5b is connected to the bias terminal V1, and the connection layer 5a is connected to the bias terminal V2 (ground). While 5 V was continuously applied from the bias terminal V1 at 125° C., the leakage current was measured. Its result is shown in FIG. 6.

Figure 6:
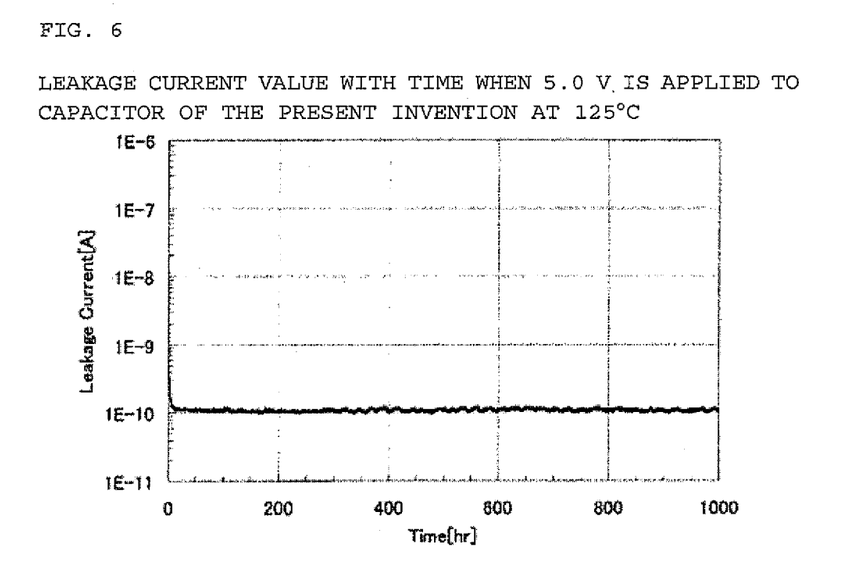
FIG. 6 is a graph showing a leakage current value with time in the capacitor according to the present invention.

In FIG. 6, the lateral axis shows a voltage application time, and the vertical axis shows a leakage current value. In addition, 1E-9[A] represents $10^{-9}$[A], that is, ln [A] in the drawing.

As is obvious from FIG. 6, the leakage current value hardly varies after the time has passed, and the leakage current value does not increase. Consequently, the highly reliable capacitor has been formed.

In addition, as for the capacitor according to this example, the capacitance value before the bias was applied was 1.9 nF and the capacitance value after the bias 3 V was applied was 1.4 nF. That is, the capacitance value varied by about 26% due to the bias application, so that it has been confirmed that the capacitance value can be adjusted by applying the voltage, that is, the resonant frequency of the resonant circuit can be adjusted.

Next, as a first comparison example, a resonant circuit was configured with the capacitor produced by the same method as the above example such that the connection layer 5a was connected to the bias terminal V1 shown in FIG. 3, and the connection layer 5b is connected to the bias terminal V2, and similarly, while 5 V was continuously applied from the bias terminal V1 at 125° C., the leakage current was measured. Its result is shown in FIG. 7.

Figure 7:
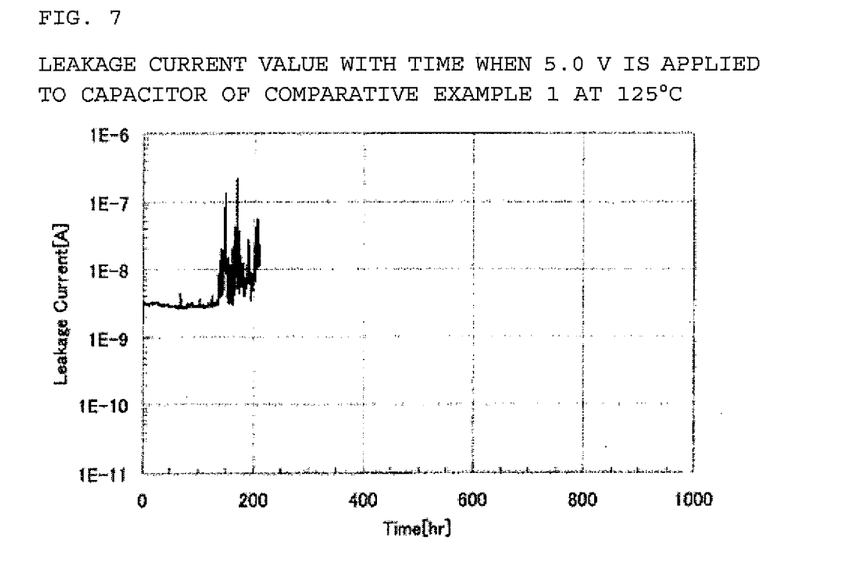
FIG. 7 is a graph showing a leakage current value with time in a capacitor according to a comparative example 1.

In FIG. 7, similar to FIG. 6, the lateral axis shows a voltage application time, and the vertical axis shows a leakage current value. In addition, 1E-9 [A] represents $10^{-9}$[A], that is, ln [A] in the drawing.

As is obvious from FIG. 7, in this case, the leakage current started to increase after 100 hours, and breakdown was caused at 200 hours, so that high reliability could not be obtained.

Furthermore, as a second comparison example, a resonant circuit was configured as shown in FIG. 3 with the capacitor having the top electrode layer 4 made of Pt. The connection layer 5b was connected to the bias terminal V1, and the connection layer 5a is connected to the bias terminal V2 (ground), and while 5 V was continuously applied from the bias terminal V1 at 125° C., the leakage current was measured. Its result is shown in FIG. 8.

Figure 8:
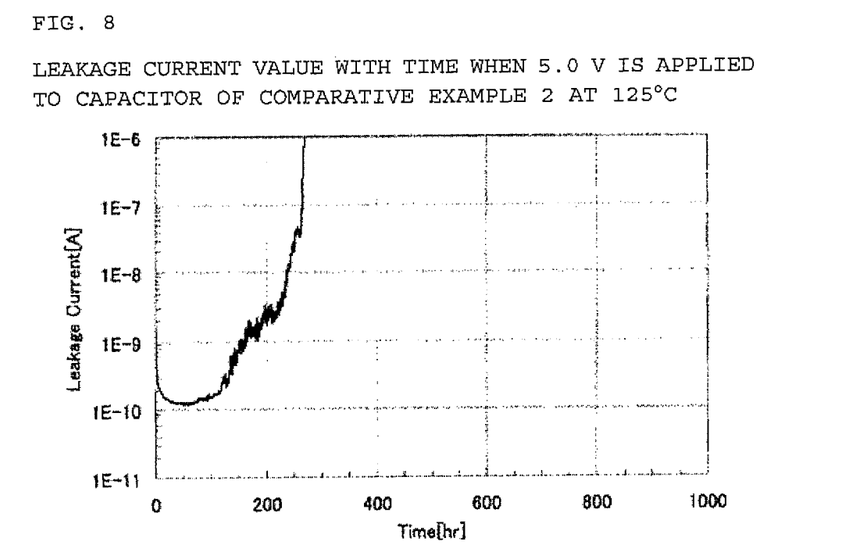
FIG. 8 is a graph showing a leakage current value with time in a capacitor according to a comparative example 2.

In FIG. 8, similar to FIG. 6, the lateral axis shows a voltage application time, and the vertical axis shows a leakage current value. In addition, 1E-9[A] represents $10^{-9}$[A], that is, ln [A] in the drawing.

As is obvious from FIG. 8, in this case also, the leakage current started to increase after 100 hours, so that high reliability could not be implemented.

Furthermore, as a third comparison example, a resonant circuit was configured as shown in FIG. 3 with the capacitor having the bottom electrode 2 made of Ir and the top electrode layer 4 made of Pt. The connection layer 5a was connected to the bias terminal V1, and the connection layer 5b was connected to the bias terminal V2 (ground), and while 5 V was continuously applied from the bias terminal V1 at 125° C., the leakage current was measured. Its result is shown in FIG. 9.

In addition, when Ir is used in the bottom electrode 2, the bottom electrode 2 is oxidized from the surface to a depth of 10 nm to 20 nm at the time of forming the dielectric 3, so that an iridium oxide layer is formed on the surface having contact with the dielectric 3. Therefore, the bottom electrode 2 has a layered structure substantially including the iridium oxide layer and the iridium layer from the side having contact with the dielectric 3, which means that the top electrode structure of the capacitor of the present invention is applied to that of the bottom electrode. In addition, when an iridium oxide layer is directly formed as the bottom electrode 2, oxygen is removed from the iridium oxide layer at the time of forming the dielectric 3, and the surface of the bottom electrode 2 could be greatly damaged, so that the iridium oxide layer is not directly formed as the bottom electrode 2 in this example.

Figure 9:
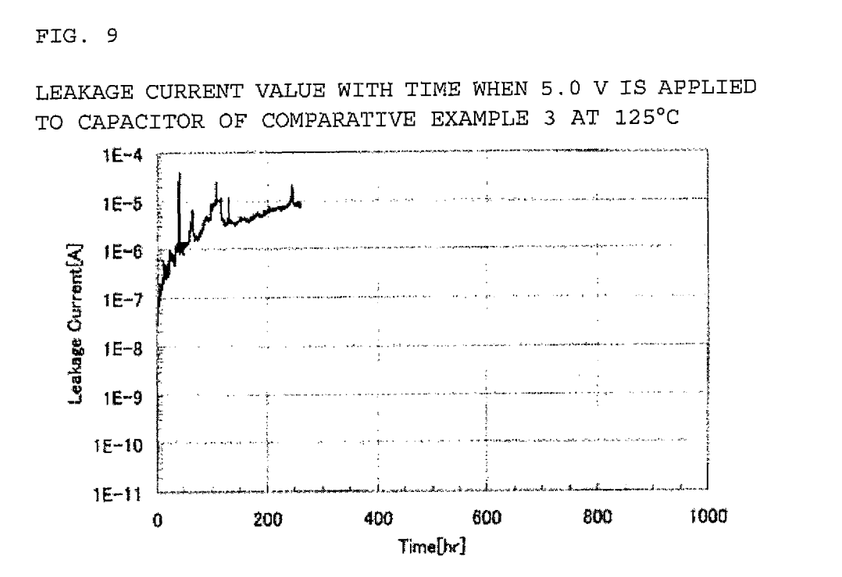
FIG. 9 is a graph showing a leakage current value with time in a capacitor according to a comparative example 3.

In FIG. 9, similar to FIG. 6, the lateral axis shows a voltage application time, and the vertical axis shows a leakage current value. In addition, 1E-9 [A] represents $10^{-9}$[A], that is, ln [A] in the drawing.

As is obvious from FIG. 9, the leakage current started to increase after one hour had elapsed since the voltage application, and breakdown was caused before 300 hours elapsed, so that high reliability could not be implemented.

Consequently, when the iridium oxide layer is used as the bottom electrode 2, the high reliability cannot be obtained even by lowering the potential of the bottom electrode 2, and it has been confirmed that it is necessary to use the iridium oxide as the top electrode 4, and lower the potential of the top electrode 4 to obtain the high reliability as shown in the example.

As described above, the capacitor according to the present invention is superior in reliability such that its leakage current is prevented from increasing with time when the DC voltage of the same polarity is continuously applied.

The invention claimed is:

1. A capacitor comprising:
    a first electrode comprising platinum;
    a dielectric layer disposed on the first electrode and made of an oxide dielectric; and
    a second electrode comprising a lower layer disposed on the dielectric layer, the lower layer consisting essentially of an iridium oxide, and an upper layer disposed on the lower layer, the upper layer consisting essentially of iridium,
    wherein a DC voltage applied to the second electrode is lower than a DC voltage applied to the first electrode, and
    wherein a leakage current of the capacitor remains substantially the same for 200 hours while same polarities of the DC voltages applied to the first and second electrodes, respectively, are continuously applied.

2. The capacitor according to claim 1, wherein the dielectric layer is made of a perovskite oxide crystal.

3. The capacitor according to claim 1, wherein the dielectric layer is made of a material having a dielectric constant varying based on the application of the DC voltages applied to the first and second electrodes.

4. The capacitor according to claim 1, wherein a cross-sectional shape of the second electrode is roughly trapezoidal with the side of the dielectric layer so that a first main surface of the second electrode which is in contact with the dielectric is larger than a second main surface of the second electrode opposite the first main surface.

5. A resonator comprising:
    a capacitor according to claim 1; and
    an impedance element comprising an inductor portion and connected to the capacitor.

6. A filter apparatus comprising a resonator according to claim 5.

7. A communication device comprising:
    at least one of a receive circuit and a transmission circuit each comprising a filter apparatus according to claim 6.

8. The capacitor according to claim 1, wherein the lower layer is thicker than the upper layer.

9. An electric circuit, wherein
    a capacitor element comprises
        a first electrode consisting essentially of platinum,
        a dielectric layer located on the first electrode and made of an oxide dielectric, and
        a second electrode comprising a lower layer disposed on the dielectric layer, the lower layer consisting essentially of an iridium oxide, and an upper layer disposed on the lower layer, the upper layer consisting essentially of iridium, and
    the capacitor element is connected to a bias circuit for applying DC voltages to the first and second electrodes such that the potential of the DC voltage applied to the second electrode is smaller than that of the first electrode, wherein a leakage current of the capacitor remains substantially the same for 200 hours while same polarities of the DC voltages applied to the first and second electrodes, respectively, are continuously applied.

10. The electronic circuit according to claim 9, wherein the lower layer is thicker than the upper layer.

* * * * *